United States Patent [19]

Koubek

[11] 3,900,789

[45] Aug. 19, 1975

[54] THYRISTOR SWITCHING POWER CIRCUIT

[76] Inventor: Michael Koubek, Ortlindestrasse 2, 8000 Munich 81, Germany

[22] Filed: June 4, 1973

[21] Appl. No.: 366,502

[30] Foreign Application Priority Data

June 12, 1972 Germany ........................ 2228542

[52] U.S. Cl. ........................ 321/47

[51] Int. Cl. ........................ H02m 7/00

[58] Field of Search ............ 321/47, 18; 323/22 SC, 323/36, 39; 307/252 J

[56] References Cited

UNITED STATES PATENTS

| | | | |
|---|---|---|---|
| 3,532,967 | 10/1970 | Milton et al. | 323/22 SC |
| 3,567,996 | 3/1971 | Gordon et al. | 321/18 X |
| 3,621,361 | 11/1971 | Barth | 321/18 X |
| 3,721,892 | 3/1973 | Ohyama et al. | 321/47 |

*Primary Examiner*—R. N. Envall, Jr.

[57] ABSTRACT

A thyristor switching power circuit for providing from a single a.c. supply input, a plurality of different power sources, both d.c. and a.c. of different voltages and different frequency which employs only a single thyristor fired by a diac. This thyristor switching power circuit is particularly advantageous for supplying all of the power requirements of a color television receiver. The circuit has high degree of short-circuit resistance and overload safeguards.

5 Claims, 2 Drawing Figures

THYRISTOR SWITCHING POWER CIRCUIT

BACKGROUND OF THE INVENTION

The general field of the present invention relates to a circuit arrangement for a thyristor switching power unit for the current supply of electrical equipment, in particular television apparatus. Switching power units are known which operate in accordance with transducer principles, the transducers being provided as electronic switches. A switching power unit of this kind is described, for example, in "Funkschau," 1971, Edition 8, page 235 to 238. A considerable disadvantage occurs in this type of switching power unit — if it is to be resistant to short-circuits and controllable — in that this can be achieved only with a relatively high circuitry outlay.

Horizontal deflection circuits are known which operate with thyristors and are additionally used for current supply purposes. Such a circuit, with two thyristors, is described, for example, in "Radio Mentor," 1971, Edition 11, page 653 to 659, Edition 12, page 710 to 713, and 1972 Edition 1, page 20 to 21. In this case, the circuitry outlay is lower, as no additional measures are required for overload or short-circuits. However, the linking of horizontal deflection and power supply complicates not only service but also production.

BRIEF SUMMARY OF THE INVENTION

A transistor switching power circuit for the current supply of electric equipment and in particular for television apparatus which supply has short-circuit resistance and overload safeguards. A source of a.c. which is provided at two input terminals is connected to a rectifier stage which supplies d.c. voltage to two terminals with one of two d.c. terminals connected to one of the a.c. terminals and to a reference potential. Between the other of the two terminals and a point, there is arranged an inductance coil and between this point and the reference potential there are four parallel connections, the first consisting of a series connected first resistor and a first capacitor, the second being formed by a thyristor, the third being formed by a first diode lying in an anti-parallel line direction to the thyristor, and the fourth being a series connection of a second capacitor and a second inductance coil. Additionally, between the said point and the point of connection of the first resistor to the first capacitor, there lies a series connection of a second resistor to a second diode with this connection point leading by a diac to the ignition electrode of the thyristor. The first inductance coil constitutes the primary winding of a transformer, whose secondary winding leads to two output terminals. Modifications of the invention consist in providing between the first resistor and the first capacitor a third diode in anti-parallel direction to the second diode. Another modification of the present invention consists in providing a compensating coil between the second capacitor and the second coil.

A different form of the present invention includes connecting in parallel with the secondary winding of the transformer a series connection of a diode with a capacitor and parallel to this capacitor the series connection of a Zener diode with a resistor, this resistor lying between the base and the emitter of a transistor whose collector leads via the diac to the ignition electrode of the thyristor and whose emitter is connected to the reference potential.

It is an object of the present invention to provide a circuit arrangement for a switching power unit which combines the high operational ability of a thyristor circuit with the advantages of a switching power unit which is separate from other functions, such for example, as horizontal deflection.

DETAILED DESCRIPTION

Figure 1:
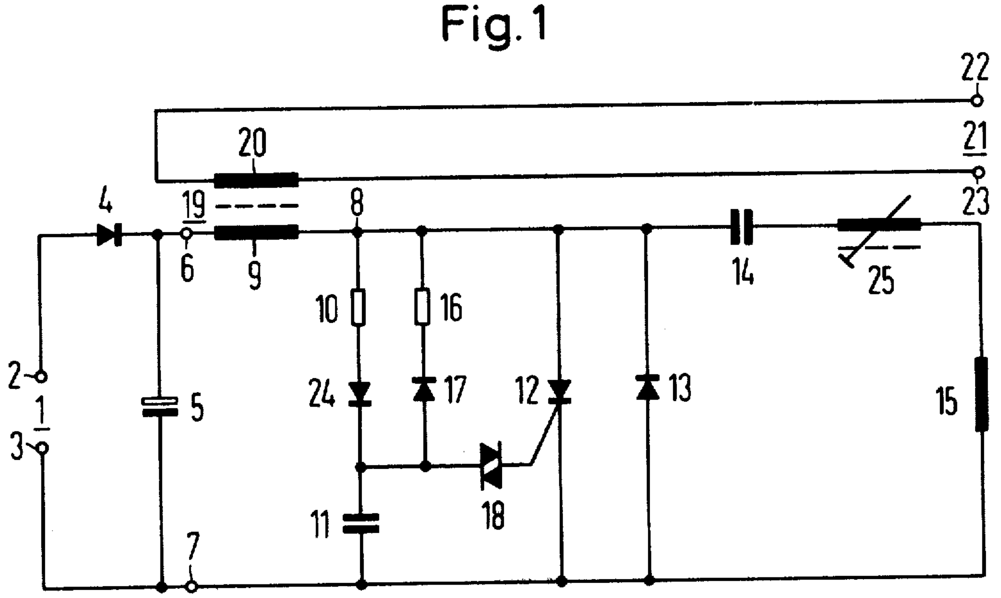
FIG. 1 is an illustrated embodiment of the fundamental circuit of the present invention.

In the circuit illustrated in FIG. 1, an a.c. input 1 has two terminals 2 and 3. Between these terminals 2 and 3 lies the series connection of a diode 4 with a capacitor 5. Thereafter, two terminals 6 and 7 are provided on opposite sides of the capacitor 5, the terminal 7, with the input terminal 3, being connected to reference potential. The rectified a.c. voltage is connected to the terminals 6 and 7. Between the terminal 6 and a point 8 lies an inductance coil 9.

Between the point 8 and the reference potential there exist four connections, which are parallel to one another. The first connection is formed by the series connection of a resistor 10 to a diode 24 and to a capacitor 11. The diode 24 may be omitted, if desired. The second connection is formed by a thyristor 12, the third by a diode 13, the direction of transmission of the diode 13 being anti-parallel to that of the thyristor 12. The fourth connection consists of the series connection of a capacitor 14 with a choke coil 25 and with a coil 15. Between the point 8 and the point of connection of the diode 24 to the capacitor 11 lies the series connection of a resistor 16 with a diode 17, this diode 17 and the diode 24 being connected in anti-parallel fashion with respect to the transmission direction. Furthermore, the connection point of the diode 24 to the capacitor 11 leads via a diac 18 to the ignition electrode of the thyristor 12. Resistor 16 must have a value smaller than that of resistor 10 to provide rapid discharge of capacitor 11.

The coil 9 forms the primary winding of a transformer 19, whose secondary winding 20 leads to an output 21 with the terminals 22 and 23. An output a.c. voltage may be withdrawn at these terminals 22 and 23.

The alternating supply voltage applied to the input terminals 2 and 3 is rectified with the aid of the diode 4. A d.c. voltage is consequently available across the terminals 6 and 7. If one commences from the fact that the thyristor 12 and the diode 13 are blocked, then via the coil 9, the compensating coil 25 and the coil 15, the capacitor 14 is charged to the d.c. voltage connected to the capacitor 5. At the same time the capacitor 11 is charged via the resistor 10 and via the diode 24, again commencing from zero. As soon as the ignition voltage of the diac 18 has been reached on the capacitor 11, the charge of this capacitor 11 flows to the ignition electrode of the thyristor 12 and ignites the latter. As a result of the stored energy, an oscillation is formed which initially produces a positive current half wave through the thyristor 12. With the zero transition of this oscillation, i.e., at the end of the positive half wave, the thyristor 12 is extinguished and the diode 13 assumes the negative half wave of the oscillation. With the next zero transition after the negative half wave, the thyristor 12 is already blocked so that the oscillation cannot execute another positive half wave, but is extinguished. The voltage across the thyristor then leaps back to a positive value. When the thyristor 12 goes conductive, the capacitor 11 is simultaneously discharged via the diode 17 and via the resistor 16, and remains held at approximately 0 Volts for the duration of the oscillation. However, as soon as the voltage across the thyristor becomes positive again, the diode 17 blocks and the capacitor 11 can again charge via the resistor 10 and via the diode 24. The diode 17 is required since the resistor 16 must be selected to be smaller than the resistor 10, in order that a rapid discharge of the capacitor 11 can be achieved. The advantageously interposed diode 24 enables clean dimensioning of the charge and discharge periods, but is not absolutely necessary for the function and can even be dispensed with in a simplified design.

With the aid of the compensating coil 25 the switch-through time of the thyristor 12 and of the diode 13 can be finely adjusted. Via the secondary winding 20 of the transformer 19, formed with the primary winding 9, a transformed output voltage may be withdrawn at the output 21. It is also conceivable to withdraw further output voltages via a secondary winding which is inductively coupled to the coil 15. The secondary windings can in each case contain several windings, or windings with tappings, to which are connected arbitrary consumers. As a rule rectifiers are connected to the windings.

A switching power unit of this kind is usually operated at high frequencies so that ferrites, which enable a small and light construction, may be used as cores for the transformers and coils. A circuit of this kind can be used not only in television equipment but in any case in which a heavy and large power supply transformer is to be replaced by a space-saving low-weight arrangement of high reliability. In comparison to known switching power circuits, a circuit arrangement in accordance with the present invention offers the great advantage that, due to the small number of elements, and the high reliability of thyristors, even in the case of overload and shortcircuit there is no destruction. In contrast with known thyristor horizontal deflection circuits, the present invention requires only one thyristor, and thus, a clean separation of current supply and horizontal deflection is possible.

Figure 2:
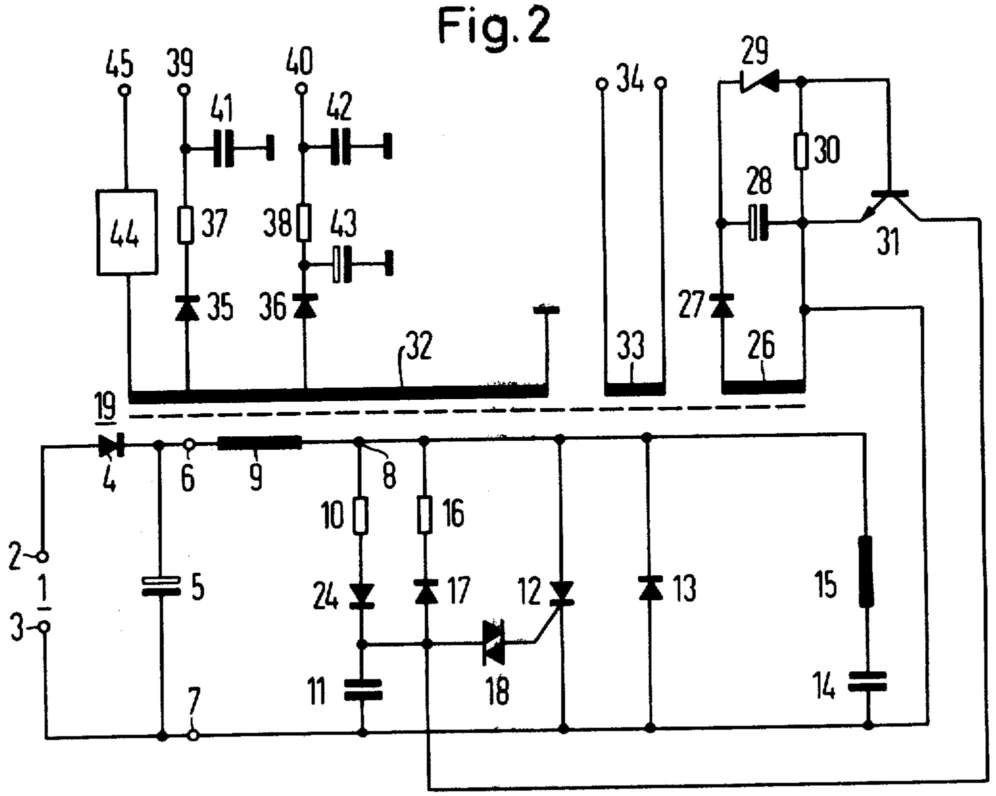
FIG. 2 is a circuit diagram illustrating a more elaborate arrangement of the thyristor switching power circuit of a preferred embodiment of the present invention.

One preferred embodiment of the present invention of a circuit arrangement is shown in FIG. 2, and includes the production of the high voltage for the picture tube of a television receiver in the power unit. A control circuit is also provided. In a case of this kind, the conventional production of the high voltage from the horizontal end stage can be dispensed with. This provides the possibility of entirely dispensing with a transformer in horizontal end stages and simultaneously avoiding the main danger point in horizontal end stages, namely, high voltage spark-overs. Now such high voltage spark-overs can affect only the power supply unit which, however, is extremely resistant to this type of stress as a result of the thyristor.

The fundamental circuit of the embodiment shown in FIG. 2 corresponds basically to that of the embodiment shown in FIG. 1. This applies to the input 1, the diode 4, the capacitor 5, the coil 9, the resistor 10, the diode 24, the capacitor 11, the resistor 16, the diode 17, the diac 18, the thyristor 12, the diode 13, the capacitor 14 and the coil 15. As a result of the addition of a control circuit, in this case, the compensating coil 25 can be dispensed with, as any tolerances can be compensated by the control function. The secondary of the transformer 19, whose primary is coil 9, comprises three windings, namely, a secondary winding 32 possessing a plurality of tappings, a secondary winding 33 leading to an output 34, at which is withdrawn an a.c. voltage, for example, for heating an image tube, and a secondary winding 26 feeding the control circuit.

One end of the secondary winding 26 is connected to the reference potential. The other end leads via the series connection of a diode 27 and a capacitor 28 to the reference potential. In parallel to the capacitor 28 lies the series connection of a Zener diode 29 with a resistor 30. The resistor 30 lies between the base and the emitter of a transistor 31. The emitter of this transistor 31 is connected to reference potential and the collector leads via the diac 18 to the ignition electrode of the thyristor 12.

Two of the tappings of the secondary coil 32 lead via rectifiers 35 and 36, and via resistors 37 and 38 to outputs 39 and 40. The output end 39 of resistor 37 is connected through a capacitor 41 to ground. The output end 40 of resistor 38 is connected through a capacitor 42 to ground. Also from a point between the diode 36 and the resistor 38 a capacitor 43 leads to ground. The outputs 39 and 40 provide a d.c. voltage take-off, whose magnitude depends upon the tapping points of the secondary 32. It is possible to provide additional corresponding tappings with rectified output, as required. One end of the secondary winding 32 is connected to ground, and the other end leads via a multiplier cascade 44 to an output 45. At this output 45 a high voltage is supplied, which is required, for example, for the image tube of a television receiver.

At the secondary winding 26 there is tapped a voltage, which is rectified via the diode 27 and withdrawn across the capacitor 28. The transistor 31 is driven via the Zener diode 29. If the output voltage of the transformer 19 rises for any reason, the Zener diode 29 goes conductive and a corresponding base current flows in the transistor 31 which thus draws more current. Consequently, a part of the charge current which flows via the resistor 10 and via the diode 24 does not pass to the capacitor 11 but flows via the transistor 31. This extends the charging time of the capacitor 11. The oscillating frequency of the power unit is thus reduced, and energy is delivered at longer intervals of time. The output voltages become smaller, until a state of equilibrium is reached. In this way an extremely stable operation of the circuit is possible.

A circuit arrangement in accordance with the invention, in particular in the form of the second embodiment shown in FIG. 2, allows a television receiver to be supplied with all its operating voltages.

It will be well understood by those skilled in the art that many modifications and variations may be effected without departing from the spirit and scope of the novel concepts of the present invention.

I claim as my invention:

1. A thyristor switching power unit comprising two a.c. input terminals, a rectifier stage including a first diode and a first capacitor connected across said a.c. input terminals, a pair of terminals in said rectifier stage at opposite ends of said capacitor through which a d.c. voltage may be taken off, one of said a.c. input terminals and one of said d.c. supply terminals being connected together and to a reference potential, a first coil connected between the other of said d.c. supply terminals and a first circuit point, said first circuit point and said reference potential having therebetween four parallel connections, the first comprising the series connection of a first resistor and a second capacitor, the second comprising a thyristor, the third comprising a second diode which lies in an anti-parallel line direction to said thyristor and the fourth comprising the series connection of a third capacitor and a second coil, there also being a series connected second resistor and third diode connected between said first circuit point and a second circuit point in the circuit between said first resistor and said second capacitor, a diac, said diac being connected between said second circuit point and the ignition electrode of said thyristor, in which said fourth one of said parallel connections also includes in series with said capacitor and said second coil, a compensating coil means for adjusting the switch-through time of said thyristor and said second diode.

2. A thyristor switching power unit comprising two a.c. input terminals, a rectifier stage including a first diode and a first capacitor connected across said a.c. input terminals, a pair of terminals in said rectifier stage at opposite ends of said capacitor through which a d.c. voltage may be taken off, one of said a.c. input terminals and one of said d.c. supply terminals being connected together and to a reference potential, a transformer having a primary winding and a plurality of secondary windings, said primary winding being connected between the other of said d.c. supply terminals and a first circuit point, said first circuit point and said reference potential having therebetween four parallel connections, the first comprising the series connection of a first resistor and a second capacitor, the second comprising a thyristor, the third comprising a second diode which lies in an anti-parallel line direction to said thyristor, and the fourth comprising the series connection of a third capacitor and a coil, there also being a series connected second resistor and third diode connected between said first circuit point and a second circuit point in the circuit between said first resistor and said second capacitor, a diac, said diac being connected between said second circuit point and the ignition electrode of said thyristor, one of said secondary windings of said transformer including the series connection of a fifth diode with a fourth capacitor in parallel thereacross, a third resistor and a Zener diode serially connected across said fourth capacitor, a transistor having its base emitter circuit connected across said third resistor and its collector connected to said second circuit point, said emitter being connected to said reference potential.

3. A thyristor switching power unit according to claim 2, in which said first parallel connection also includes a fourth diode between said first resistor and said second circuit point, said fourth diode being disposed in an anti-parallel line direction with said third diode.

4. A thyristor switching power unit according to claim 2, in which a second secondary winding of said transformer provides an a.c. output voltage.

5. A thyristor switching power unit according to claim 2, in which one end of a third one of said secondary windings is connected to said reference potential, a cascade multiplier connected to the opposite end of said third one of said secondary windings, a sixth diode, a fourth resistor and a fifth capacitor being serially connected to said reference potential from a tap on said third one of said secondary windings, a seventh diode, a fifth resistor and a sixth capacitor being serially connected to said reference potential from another tap on said third one of said secondary windings, a seventh capacitor being connected between a point between said seventh diode and said fifth resistor to said reference potential, and a pair of d.c. terminals connected to points between said fourth resistor and said fifth capacitor and said fifth resistor and said sixth capacitor, respectively.

* * * * *

UNITED STATES PATENT OFFICE

CERTIFICATE OF CORRECTION

PATENT NO. : 3,900,789

DATED : August 19, 1975

INVENTOR(S) : Michael Koubek

It is certified that error appears in the above-identified patent and that said Letters Patent are hereby corrected as shown below:

Please indicate Assignee of record to be as follows:

Siemens Aktiengesellschaft, Berlin and Munich.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*